US006675328B1

(12) United States Patent
Krishnamachari et al.

(10) Patent No.: US 6,675,328 B1
(45) Date of Patent: Jan. 6, 2004

(54) SYSTEM AND METHOD TO DETERMINE DATA THROUGHPUT IN A COMMUNICATION NETWORK

(75) Inventors: Srivathsan Krishnamachari, Cambridge, MA (US); Neil Judell, Andover, MA (US)

(73) Assignee: Vigilant Networks, LLC, Hampton, NH (US)

( * ) Notice: Subject to any disclaimer, the term of this patent is extended or adjusted under 35 U.S.C. 154(b) by 432 days.

(21) Appl. No.: 09/684,453

(22) Filed: Oct. 6, 2000

Related U.S. Application Data
(60) Provisional application No. 60/158,515, filed on Oct. 8, 1999.

(51) Int. Cl.[7] .................................................. G06F 11/00
(52) U.S. Cl. ..................................... 714/704; 714/825
(58) Field of Search ............................ 324/532, 628; 709/220–224; 370/240; 714/704, 712

(56) References Cited

U.S. PATENT DOCUMENTS

| | | | |
|---|---|---|---|
| 5,553,059 A | | 9/1996 | Emerson et al. ............... 370/14 |
| 5,570,029 A | * | 10/1996 | Bottman et al. ............ 324/628 |
| 6,177,801 B1 | * | 1/2001 | Chong ........................ 324/520 |

OTHER PUBLICATIONS

Dempsey et al., Predicting FDDI computer network performance using a claibrated software simulation model, 1997, IEEE, p. 1–9.*
Pollakowski et al., On the validity of loop and crosstalk models for VDSL, Nov. 1996, Globecom, p. 1/7–7/7.*
Albert et al., Performance analysis of FDDI Lans using numberical methods, 1995, IEEE, p. 379–386.*
Bucci et al., Design and performance evaluation of a high throughput Ethernet/FDDI interconnect.*
Weizheng Wang (editor), *Simulink, Communications Toolbox*; CD–ROM; (User's Guide, Version 2), May 1997, The MathWorks, Inc., pp. I–VIII; pp. 1–2–pp. 1–8; pp. 3–119–pp. 3–120; pp. 4–2–pp. 4–44; pp. 6–2–pp.6–7; XP–002165408.

Lennart Ljung (editor), *System Identification Toolbox,* For Use with MATLAB,; CD–ROM; (User's Guide), Aug. 1995, The MathWorks, Inc.; pp. IV–IX; pp. 1–2 to 1–4; XP–002165409.

*Data Acquisition Toolbox,* For Use With MATLAB; CD–ROM (User's Guide, Version 1.0), May, 1999, The MathWorks, Inc., pp. I–XIX, XP–002165410.

Peter Newman (editor), *ATM Local Area Networks,* IEEE Communications Magazine, IEEE Service Center, Piscataway, N.J., vol. 32, No. 3, Mar. 1, 1994, New York, pp. 86–98; XP–000442191.

Averill M. Law and Michael G. McComas (editors), *Simulation Software For Communications Networks: The State of the Art,* IEEE Communications Magazine, IEEE Service Center, Piscataway, N.J., Vol 32, No. 3, New York, Mar. 1, 1994, pp. 44–50; XP–000442186.

Amir Behroozi–Toosi and Subhash Bhatia (editors), *Modeling Of Computer Networks And Systems Using SES/Workbench; Proceedings of the Midwest Symposium on Circuits and Systems,* U.S., New York, IEEE, vol. 2, Symp. 34, May 14–17, 1991, pp. 992–996; XP–000333629.

Lawrence A. Des–Jardin (editor), *VXIbus: A Standard for Test and Measurement System Architecture,* Hewlett–Packard Journal, U.S. Hewlett–Packard Co., Palo Alto, vol. 43, No. 2, Apr. 1992, pp. 6–14; XP–000356378.

* cited by examiner

Primary Examiner—Christine T. Tu
Assistant Examiner—Shelly A Chase
(74) Attorney, Agent, or Firm—Rader, Fishman & Grauer PLLC (57) ABSTRACT

A computer network includes a transmitter, a receiver, and a communication channel system interconnecting the transmitter and receiver. All components in the system may be physical equipment or may be models having predefined operational characteristics. The predefined operational characteristics may be monitored or modified to obtain benchmarking and error rates for the computer network.

8 Claims, 7 Drawing Sheets

SYSTEM AND METHOD TO DETERMINE DATA THROUGHPUT IN A COMMUNICATION NETWORK

RELATED APPLICATIONS

This application claims priority to U.S. Provisional Application No. 60/158,515 filed Oct. 8, 1999, the contents of which are incorporated herein by reference in its entirety.

BACKGROUND OF THE INVENTION

Transmission of data with tolerable error rate in a communication network is desired. Generally, a communication system has the following components: a transmitter, a communication channel, a communication protocol, and a receiver. In most circumstances, each of these components is subject to independent design and testing specifications developed by multiple controlling organizations focusing narrowly on one element of the communication system. Also, manufacturers specializing in a particular component of the communication channel build the parts of a communication system. Thus, each of the components are typically designed, manufactured and tested independently of the other components in the system. Even if each of these components corresponds to its design and testing specifications, a communication channel assembled using the component might not perform adequately in terms of data throughput due to untested interactions among the components. In fact, most communications systems do not have any specifications and methods to test the entire system with all the actual components in place.

The International Standards Organization (ISO) has defined a layered model approach for communication networks, namely, the seven-layer model for open systems interconnection. The seven layers include the application, presentation, session, transport, network, data link, and physical layers. Each layer defines a different set of protocols necessary for communication, ranging from connectors and wires in the physical layer to identification of the reply address in an email in the application layer. Information always flows down through the layers from an application layer across a real physical connection between two or more physical layer objects.

In the highest layers (application oriented) and the lowest layers (physical or network hardware dependent) of the model, many standards are supported. However, the model is dependent on using essentially a single transport layer protocol to get all the different applications working with the different low-level networks.

Different protocols for the physical layer, for example 10BaseT or 100BaseT, can be used for data transmission. 10BaseT is a protocol that operates at 10 megabits per second (MBPS) and uses twisted-pair cabling. 100BaseT is a protocol for sending data over copper cables at a rate of 100 MBPS. Various standards govern a 100BaseT system that are different than those that apply to a 10BaseT system. The 100BaseT protocol is defined by IEEE Std 803.3u (1995), "Carrier Sense Multiple Access with Collision Detection (CSMA/CD) Access Methods-Type 100Base-T." The main components of a 100BaseT system include data source coding, framing and sharing of the cable as specified in IEEE Std 802.3u. The coding and electrical specifications of the transmitted signal and the transmitter are specified in ANSI X3.263(1995), "Fiber Distributed Data Interface (FDDI)—Twisted Pair Physical Layer Medium Dependent (TP-PMD)." The specifications of the cable (for example, maximum length, impedance levels, attenuation and crosstalk) are specified by the standards TIA/EIA-568-A and TIA/EIA TSB 67. These specifications also describe connectors and patch cables. The receiver electrical and decoding specifications are described in ANSI X3.263(1995), "Fiber Distributed Data Interface (FDDI)—Twisted Pair Physical Layer Medium Dependent (TP-PMD)."

Like other communication systems, a 100BaseT computer network system includes a transmitter, a receiver and a communication channel system that includes cables and connectors to interconnect the transmitter and the receiver. Even if the system components of a 100BaseT system meet their individual acceptance criteria, cable plant assembled using these components can produce unacceptable levels of data errors measured as the ratio of packets (frames) lost due to Cyclic Redundancy Check (CRC) errors or missed detection to the total packets transmitted.

Existing testing methods may test the cable and cable components. The cable, connectors and patch cables are typically tested individually by the manufacturer according to the specifications in the TIA/EIA specifications. Further, the cable plant can be tested during installation, when Cable installers verify that the installed cable and components meet the TIA/EIA specifications for an installed cable channel. Most of the testing is done using handheld meters with measuring devices attached to both ends of the cable, and is performed before the transmitter and receiver are attached to the channel.

The Network Interface Card (NIC) manufacturers test against the FDDI-TP-PMD specifications. In addition, in certain communication networks, bit error rate testers send a preprogrammed signal through the cable and test for bit errors. However, the bit error rate testers test only the cable and do not test the actual transmitter, cable and receiver combination.

However, the end user of a communication system is more interested in the overall throughput of the system than in the performance specification of the individual components. Performance information becomes more useful if a certain throughput can be guaranteed by a communication system vendor; if the guaranteed throughput can be verified after the installation; or if the system throughput can be continuously monitored over the life of the communication system.

Using a specified communication throughput as a requirement also helps the communication system component manufacturers design and improve their products to achieve a better information throughput rate. For example, a cable manufacturer can design and optimize its cable for a particular communication protocol, transmitters and receivers. Likewise, a communication protocol designer can design a protocol that works best for existing components.

Bit error rate (BER) and packet or frame error rate are both measurements of system throughput. Frame error rate includes the ratio of packets of user information received without errors to the packets of user information sent. Bit error rate includes the ratio of quantum units (example: bits) of user or system information received without errors to the quantum units of user or system information sent.

Systems do exist today that are able to measure transmitter parameters, channel parameters, and noise levels. However, no system exists that combines the readily measurable parameters to produce a predicted or actual throughput measurement. Instead, existing systems are only capable of performing empirical throughput measurements. In such systems, a signal received by the receiver contains error-detecting information. Start and end codes and cyclic redundancy codes are incorporated within the data streams. Some Network Interface Cards (NICs) are capable of detecting errors using these self-consistency checks. By counting the number of errors received against a number of bits received, a bit error rate or packet error rate may be empirically calculated.

However, Empirical measurements of BER using a physical receiver are impractical for many reasons. First, typical error rates occur on the order of one error in $10^{12}$ transmitted bits. At maximum transmission rate on a 100BaseT network, this is approximately one error in 2.8 hours. To empirically obtain a meaningful and statistically accurate error rate from a real system, one would need to measure for a duration of ten to one hundred times the error interval, so testing would require anywhere from one to ten days of measurement. Second, the physical hardware being tested is affected by a variety of external factors that cause inconsistent empirical measurements over repeated trials. This makes the calculation of an absolute BER of a communication channel (not including the receiver) impossible. Third, many physical receivers (i.e. NICs) provide only frame/packet error information. Any calculation of BER from the frame/packet error information is therefore approximate, since a packet error can correspond to more than one bit error. Finally, in many communication systems, idle signals are transmitted between packets and any system calculating frame packet errors will not identify any errors in the idle sequence between packets. Errors in idle sequence will result in loss of synchronization, and further prevent accurate measurement of BER.

SUMMARY OF THE INVENTION

The system and methodology of the present invention relate to determining the error rate and parameter margin analysis in an installed communication network. A computer network includes a transmitter, a receiver, and a communication channel system interconnecting the transmitter and receiver. The communication channel system may include, but is not limited to, patch cables and horizontal cables and the connectors at the end of cables, wall panels to which the connectors interface and patch panels that connect the patch cables to the horizontal cables.

In a particular embodiment of modeling a transmitter, the present invention captures signals from an installed transmitter, determines the transmitter parameters, replicates the transmitter pulse waveform and provides it to an arbitrary waveform generator (AWG). The AWG may then be substituted in the communication system for the actual transmitter. Further, a model is then developed that modifies the replicated pulse waveform by adjusting only physical parameters of the transmitter. In this way, the existing system may be tested for performance or parametric margins of operation, thereby identifying boundaries for successful data transmission along the communication network. Thus, in a preferred embodiment, the transmitter can be a physical transmitter, or a transmitter model built to confer certain transmitter properties, or a transmitter model which is identical to a physical transmitter with properties that can be changed individually or in combination. In an alternative embodiment of modeling the transmitter, pre-stored transmitter shapes are used with a signal generator to drive the physical cable. In another embodiment of modeling the transmitter, the measured transmitter parameters for the cable and receiver parameters are used in combination with a look-up table of headroom/error rates to predict the performance of the network.

Similarly, in a preferred embodiment, the communication channel system can be a physical medium or alternatively, a model built to comply with certain medium properties, or a medium model that is identical to a physical communication channel having properties that can be changed individually or in combination.

Further, in a preferred embodiment, the receiver can be a physical receiver, or alternatively, a model of a receiver built to meet certain receiver properties, or a receiver that is identical to a physical receiver having properties that can be changed individually or in combination.

Moreover, after characterization of the network by measurement of various operational parameters, all or part of the entire network may be virtually modeled mathematically. Once the model is developed, it is possible to vary the operational parameters and test the model for performance against the physical network in order to validate the model. Similarly, once the mathematical model is created that models the communication network, other components may be substituted for the existing components to test the network performance with different equipment. Thus, the communication network may include a physical portion and a virtual portion.

The present invention further includes the ability to vary parameters individually or in combination. In addition, the data content that is transmitted can be controlled. For example, the data content can be modeled to simulate data patterns in a real communication network. Alternatively, specific data patterns that test the response of a channel to different situations, (for example, baseline wander) can be transmitted. Further, real data captured from a physical channel can also be used as the data content transmitted.

Additionally, the present invention includes determining performance parameters after stressing the communication channel system by adjusting external parameters such as, for example, thermal, and noise parameters and electromagnetic interference sources.

Moreover, the present invention includes a method for determining a bit error rate in a computer network system. The disclosed method includes determining at least one characteristic parameter of the communication channel system, determining at least one characteristic parameter of the transmitter and determining at least one parameter of the receiver.

In a preferred embodiment, the method for determining a bit error rate in a computer network system includes sampling electrical signals in the communication channel system, measuring a plurality of cable characteristics after injecting and receiving a plurality of test signals into the computer network, and determining the bit error rate of the computer network by analyzing the measured communication channel characteristics.

Thus, the present invention relates to systems and methods to determine error rate or the throughput in a computer network. The error rate determination includes, but is not limited to, bit error rate and packet error rate in the computer network. The present invention also can provide a margin analysis for the system or components of the computer network at which the bit error rate of a specific level starts to occur.

Moreover, the present invention allows testing of all the system components together. The present invention has the ability to build and test an entire network system by using mathematical models for all the components of the system, physical components for all the components of the system, or any combination of mathematical or physical components that form the system. The mathematical models for the transmitter, the receiver, and the communication channel system can be built either from design parameters used for the design of the components or measured parameters from the existing physical components.

The present invention is versatile, as it has the ability to use values from any source, Time-Domain Reflectometry (TDR), network analyzers, parameters from handheld testers, manufacturers specification values, and user defined values.

The systems and methods of the present invention can be used by communication channel system (cables, connectors, etc.) manufacturers to design their communication channel product. The systems and methods of the present invention provide communication channel models that can determine the efficiency of their systems without the more costly alternative to building cabling systems and then testing their efficiency. Further, utility of the systems and methods of the present invention are found in the service industry where actual measurements of the communication channel systems can be performed to determine the error rate and thus, the throughput efficiency of the system. The cable plant may also be rated on its ability to perform with various types of transmitter shapes.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
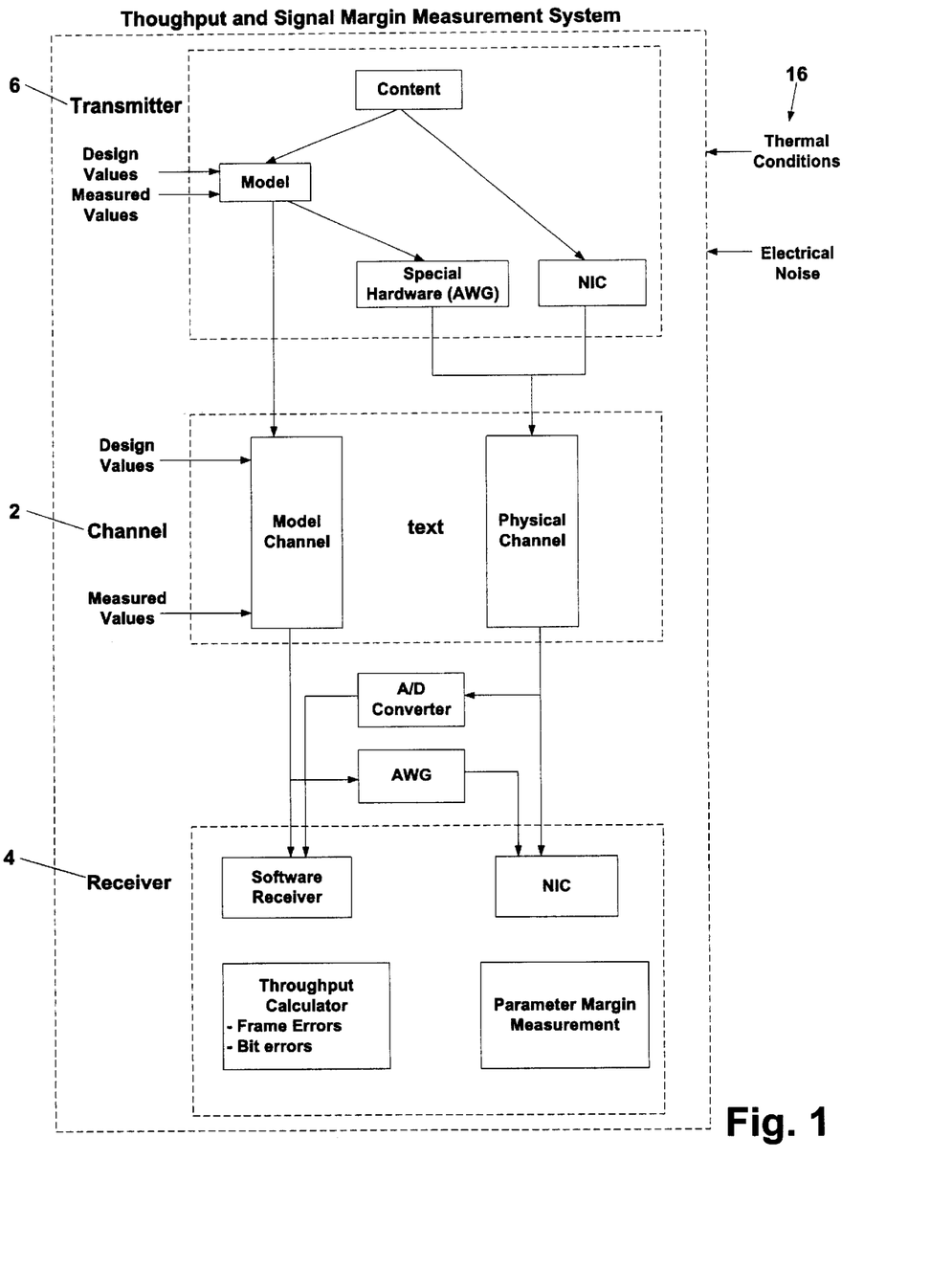
FIG. 1 is a schematic diagram illustrating the system and method to determine the error rate and parameter margin analysis in a computer network system.

Referring to FIG. 1, a schematic diagram of a throughput measurement system for a computer network is illustrated. The measurement system includes a measuring transmitter 10, a communication channel 12, receiver characteristics 14, and external disturbance factors 16 such as thermal conditions and electrical noise. According to the present invention, and as illustrated in FIG. 1, each of the system components may be a real or modeled component. In the case of a modeled component, the parameters of the model may be based upon measured or design values, and may be varied one at a time or in combination. A discussion of each component follows.

The Transmitter

Figure 2:
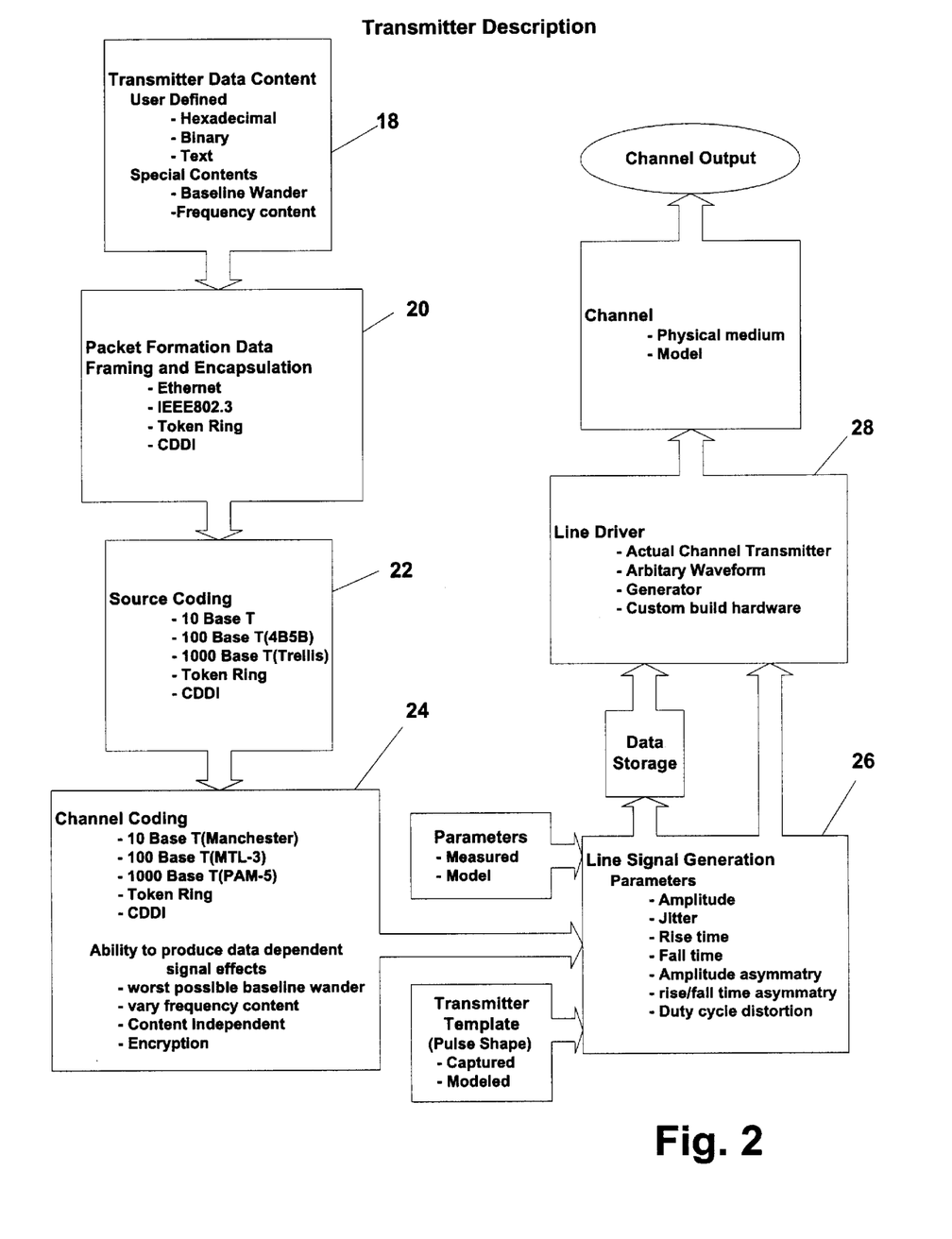
FIG. 2 is a flow chart illustrating the system and method to determine transmitter characteristics in accordance with the present invention.

First, referring to FIG. 2, the details of the transmitter 10 characteristics are provided. The transmitter mathematical model is able to simulate many types of transmitters like 10BaseT, 100BaseT and 1000BaseT, among others. As seen in FIG. 2, the transmitter Data Content 18 may be either user defined or may be limited content for special purposes. In the former, the user can control and define the data to be transmitted over the system. In the latter, the transmitter supplies stored data content optimized for specific purposes, such as for controlling the frequency content of the electrical signal over the channel or for analyzing baseline wander of the channel signal, or for any other data traffic model.

Once provided, the transmitter Data Content is transformed by Data Framing and Encapsulation 20, Source Coding 22 and Channel Coding 24. In particular, the transmitter packages the Data Content into a data frame that normally includes destination address, source address, frame check sequences and data padding. The transmitter may frame data according to many types of framing specifications including, but not limited to, IEEE 802.3 and FDDI. Once packaged, the frame is transformed by source and channel coding. The transmitter also injects stored channel and source coded signals for the purposes of controlling the frequency content of the signal on the channel.

Once framed, the Data Content is transformed to a signal generated by the Line Signal Generation portion 26 of the transmitter. Most computer communication signals transmit rectangular/trapezoidal pulse signals over the channel with amplitude and phase chosen to correspond to the transformed data. In addition, these pulse signals are characterized by the following parameters:

Amplitude

Jitter

Rise time

Fall time

Amplitude asymmetry between negative and positive pulses

Rise/fall time asymmetry

Duty cycle distortion

General pulse shape

Noise

Each different transmitter parameter causes problems when not within defined limits. For example, the rise and fall times generally must be within a specific time interval. Very slow rise and fall times will result in errors in clock extraction in the receiver, and increased inter-symbol interference because the signal might not reach their maximum amplitude within one clock period. Very fast rise times result in increased energy at high frequencies and therefore higher level of cross talk in the neighboring signal paths. This makes it important to model the transmitters at both ends of the cable because high rise/fall times in a signal path produces increased noise in the next signal path.

The jitter parameter is a measure of the variation of the actual transmitter pulse edge time from the expected time. For example, the expected time normally is 8 nanoseconds for 100BaseT, though it need not be. Jitter results in receiver errors.

The amplitude parameter is another measure used to model the transmitter. A signal is attenuated on passing through the cable. In the receiver, the received signal level is used to estimate the length of the cable and used to compensate for the frequency dependent signal attenuation by the cable. High amplitude of the transmitter pulse may result in higher than normal energy in reaching the receiver and thereby the receiver underestimating the length of the cable and providing inadequate compensation at high frequencies. This results in a distorted signal. On the other hand, low transmitter amplitude, may result in over compensation of the high frequency components relative to the low frequency components.

The positive and negative pulse symmetry parameter results in baseline drift due to unequal levels of positive and negative voltages over a transformer coupled differential pair of wires. The baseline shift introduces errors in the receiver.

In addition to the above parameters, the shape of the pulse is also a decisive factor. A particular transmitter pulse may meet all the TP-PMD specifications, but still have an eccentric shape capable of producing errors. This makes it very important to simulate the actual pulse shapes of the transmitter used in a particular network. According to the system, all the parameters may be varied in the transmitter model. These parameter inputs can be either design values or measured values from an actual transmitter.

Once generated, a transmitter Data Content is transformed into a Transmitter Output Line 28. In general, there are three types of transmitter output. First, the output may be generated as a file output, wherein the modeled line signal is stored in a file as input to a mathematical cable model. Second, the modeled line signal can be used to drive a digital to analog (D/A) converter, an Arbitrary Waveform Generator, or any other device that in turn can be used to drive the communication channels. Third, the user chosen or stored data content may be input to a Network Interface Card (NIC) which in turn will drive the communication channel and be received by the receiver.

The Communication Channel

Figure 3:
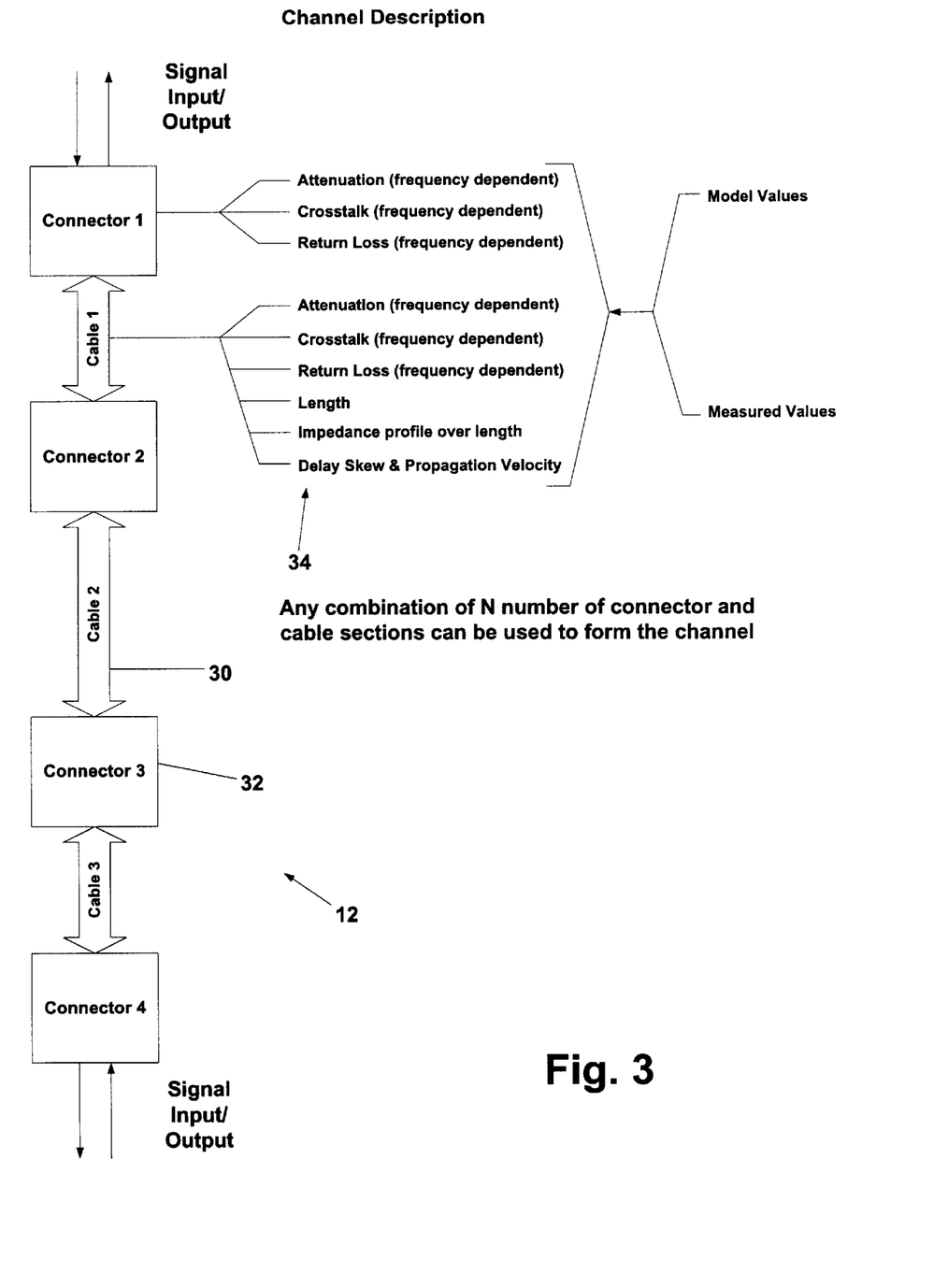
FIG. 3 is a diagram illustrating the system and method to determine the communication channel or cabling system characteristics in accordance with the present invention.

Details of the communication channel characteristics are described and shown in FIG. 3. As noted previously, a channel 12 is formed by a series connection of any number of cables 30 and connectors 32. For each of these components, various parameters 34 that affect the signal transmission may be modeled. Additionally, all modeled parameters may be developed by using design values or by using values measured from existing physical cables or connectors. During propagation through the channel, a transmitted signal reaches the receiver using multiple paths caused by reflections in the channel. The paths used in the model can be any of the following:

1. All the paths in the model;
2. All paths that are limited to maximum number of reflections; or
3. All paths for which the signal level reaching the receiver is above a minimum threshold.

Similarly, cross-talk signals are also modeled by multiple paths. Cross-talk can be caused by signals traveling in parallel in the same direction or signals traveling in opposite directions. Signals traveling in parallel, along multiple sub-channels, in the same direction are also modeled. Each of the following parameters can be developed by using design values or using measured values from physical cables or connectors.

A first parameter in the model is attenuation. Attenuation specifies how the amplitude and phase of the signal are modified during propagation. It is a frequency dependent parameter and is also dependent on the length of the channel component. For example, when modeling a cable, attenuation can be described by $$\text{Attenuation}(f, x) = e^{-\alpha * \sqrt{f} * x} e^{-j(\alpha * \sqrt{f} + \beta * f) * x}$$

where f is frequency and x is distance. "α" and "β" are design parameters. This model can be extended to include the dependence of attenuation on frequency (f) and $1/\sqrt{f}$. However, if desired, this modeled function may be replaced by a measured attenuation function.

A second parameter is crosstalk. Crosstalk specifies the amplitude and phase of the signal induced in a sub-channel due to a signal traveling in an adjacent sub-channel, and may be modeled as:

$$\text{Cross-talk}(f) = \frac{A * j * f}{A * j * f + 1}$$

"A" is a design parameter, while j is a complex number f is frequency. This preferred model models cross-talk as a resistive capacitive (RC) circuit. However, the preferred model may be replaced by other models that include inductive effects. Similarly, the modeled function may be replaced by a measured cross-talk function.

Return-Loss specifies the signals that return to the transmitting end due to reflections in the channel. Return-loss reflections first may be caused by impedance mismatch, which is accounted for by calculating signal through multiple paths that originate in the transmitter and end in the transmitter side. A second cause of return-loss arises from reflections due to imperfections in the construction of the cable. In particular, physical imperfections in the cable cause small impedance changes that produce reflections. This is modeled as $B\sqrt{f}$, where "B" is a design parameter. As with previous functions, the modeled return-loss function may be replaced by a measured return-loss function.

Length of the cable component affects attenuation, delay and delay skew. The length can be either a modeled value or an actual measured value.

The model also accounts for the cable component impedance profile. Each cable has its own characteristic impedance. Even a series of these cables form a channel that has a varying impedance profile over length. Installation practices like punch-down and patch-panels also affect the impedance profile. At the points of impedance change, signal reflections occur and the amount of reflected and transmitted signal depends on the ratio of the impedance levels on either sides of the impedance change. These reflections are also frequency dependent.

Other parameters include propagation velocity and delay skew. The velocity of the signal along a cable depends on the cable electrical properties, which define the propagation velocity in the cable. Additionally, due to differences in electrical properties, signals traveling along parallel sub-channels can arrive at different times at the receiving end. This difference in time of arrival is known as delay skew. Delay skew will cause alignment errors in the receiver. In the model sub-channels can be modeled with different propagation velocities to simulate delay skew.

Ambient Noise is the noise induced in the cable from the surrounding environment. The ambient noise can be generated from stored noise models or by new models generated after measuring the environment.

Finally, the model supplies a channel output. If a mathematical channel model is used, the output will be a waveform file. If a physical channel is used, the output is an electrical signal that can be used directly or can be sampled and stored in a file.

The method and system of the present invention may use, but is not limited to, Time-Domain Reflectometry (TDR) to measure the length of the cable, network analysis, values for any source, user defined values, parameters from handheld testers, and manufacturers specification values. In addition to the length of the cable, the TDR also provides parameters for the attenuation model of the cable, impedance of the horizontal cable, patch cable and return loss.

The Receiver

As noted above, bit error rate (BER) calculation using a physical receiver for many communication systems is impractical. Because of the low error rates, using a physical receiver may produce varying measurements of error rate when realistic measurement periods are used. Different physical NIC receivers also produce different measured error rates, even if manufactured according to the same specifications. In fact simply varying the temperature of the receiver slightly can have a dramatic impact on the measured error rates. In contrast, the preferred embodiment software receiver and model was designed to overcome these problems. The modeling approach makes the time for calculation very short and the software implementation approach makes it repeatable. BER is directly calculated instead of approximating it from frame error rates. As a result, the calculation method of the preferred embodiment yields results that do not vary with measurement duration.

Figure 4:
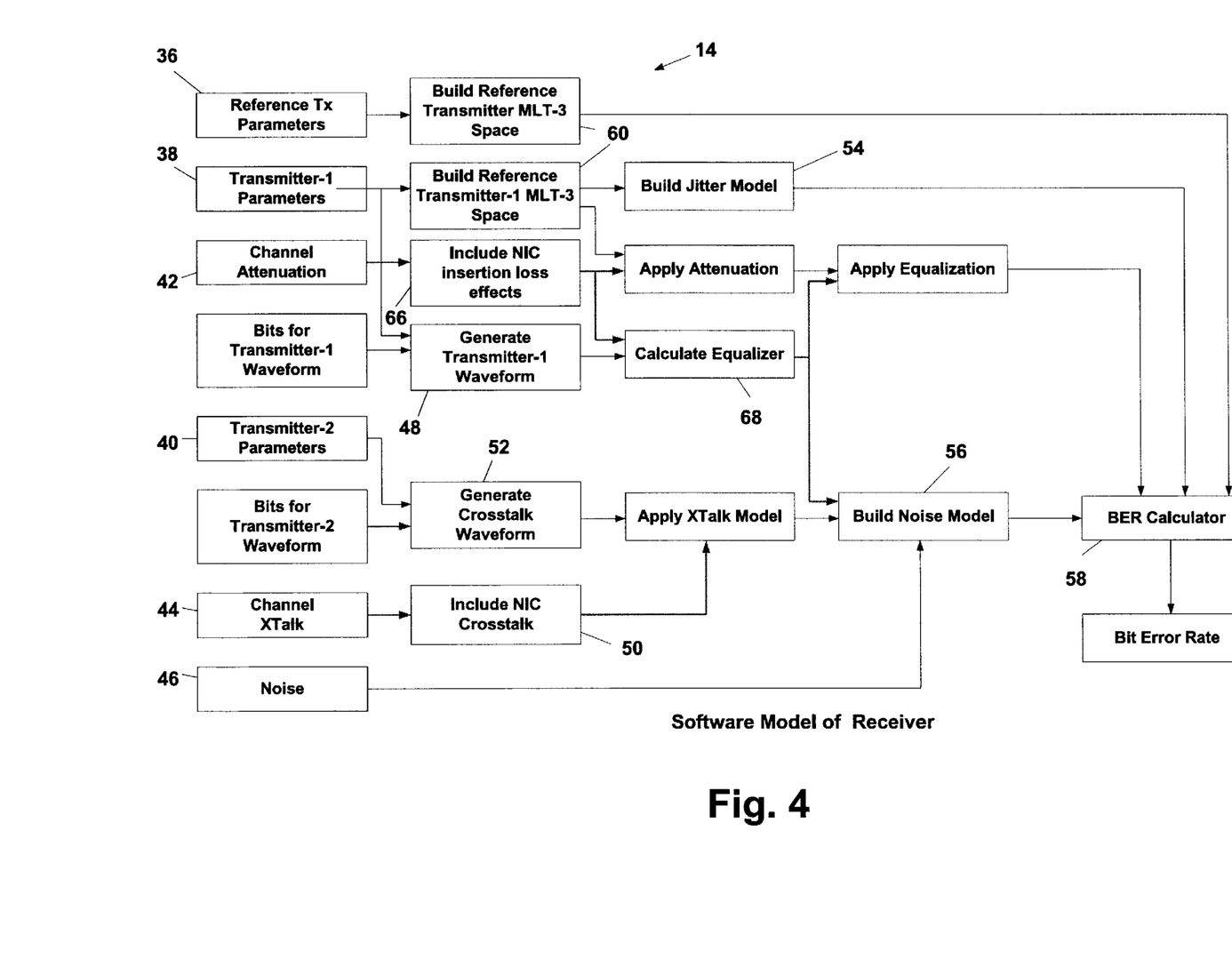
FIG. 4 is a block diagram illustrating a software model of the receiver in accordance with the present invention.

The software receiver components 14 and signal flow paths are shown in FIG. 4. The processing blocks in the receiver are described below, and include Input Blocks and Processing Blocks.

The Input Blocks model the transmitter parameters, channel attenuation, cross-talk and noise. If necessary, the model may also account for any other parameter that affects signal input. As seen in FIG. 4, three main transmitter parameters are shown. First, a reference transmitter 36 is modeled. The reference transmitter 36 is the ideal model assumed by the receiver to perform its receiving functions. The receiver uses the reference transmitter parameters to build its maximum likelihood estimate receiver. Second, the model includes a Main Transmitter (Transmitter-1) 38. This is the transmitter that actually sends the waveforms to the receiver over the channel. Third, the model includes a Cross-talk transmitter (Transmitter-2) 40. The Cross-talk transmitter is in the receiving end and acts as the source of any cross-talk noise.

In general, each transmitter must include several parameters that are used to define the transmitter function. A first parameter needed to define the transmitter function is the step response of the transmitter, which may be an actual measured transmitter response or a mathematical transmitter response model with the ability to adjust rise/fall times, amplitude and overshoot. Additionally, the transmitter function must account for the peak-peak jitter of the transmitter and the jitter distribution model, as well as any noise in the transmitter output, amplitude asymmetry in the positive and negative pulses, and the clock period. The jitter, noise, amplitude asymmetry and clock period can either be measured values or theoretical design models.

The transmitter input includes a block for Channel Attenuation, seen at reference 42 in FIG. 4. The channel attenuation $H_{channel\_attn}$ can be measured using a network analyzer or similar tool over a frequency band of interest. This can be used as a multiplicative transfer function in the frequency domain or a convolving channel impulse response in the time domain. Similarly, the Channel Cross-talk 44 $H_{channel\_xtalk}$ can be measured using a network analyzer or similar tool over a frequency band of interest. Like attenuation, the cross-talk may be used as a multiplicative transfer function in the frequency domain or a convolving impulse response in the time domain.

Noise is also accounted for as an input to the receiver model at reference 46, and represents external interference induced in the channel and noise in the receiver. The noise in the channel can be measured noise model or a theoretical noise model.

Once provided in the input blocks, the parameters are processed in the Processing Blocks of FIG. 4. In particular, the transmitter space converts input to a waveform at 48, while NIC card effects 50 and equalizer effects 52 are also accounted for. Using the parameters from these processing blocks, the model builds a jitter model 54, generates a cross-talk and noise model 56, and eventually calculates the Bit Error Rate (BER) 58.

Figure 5:
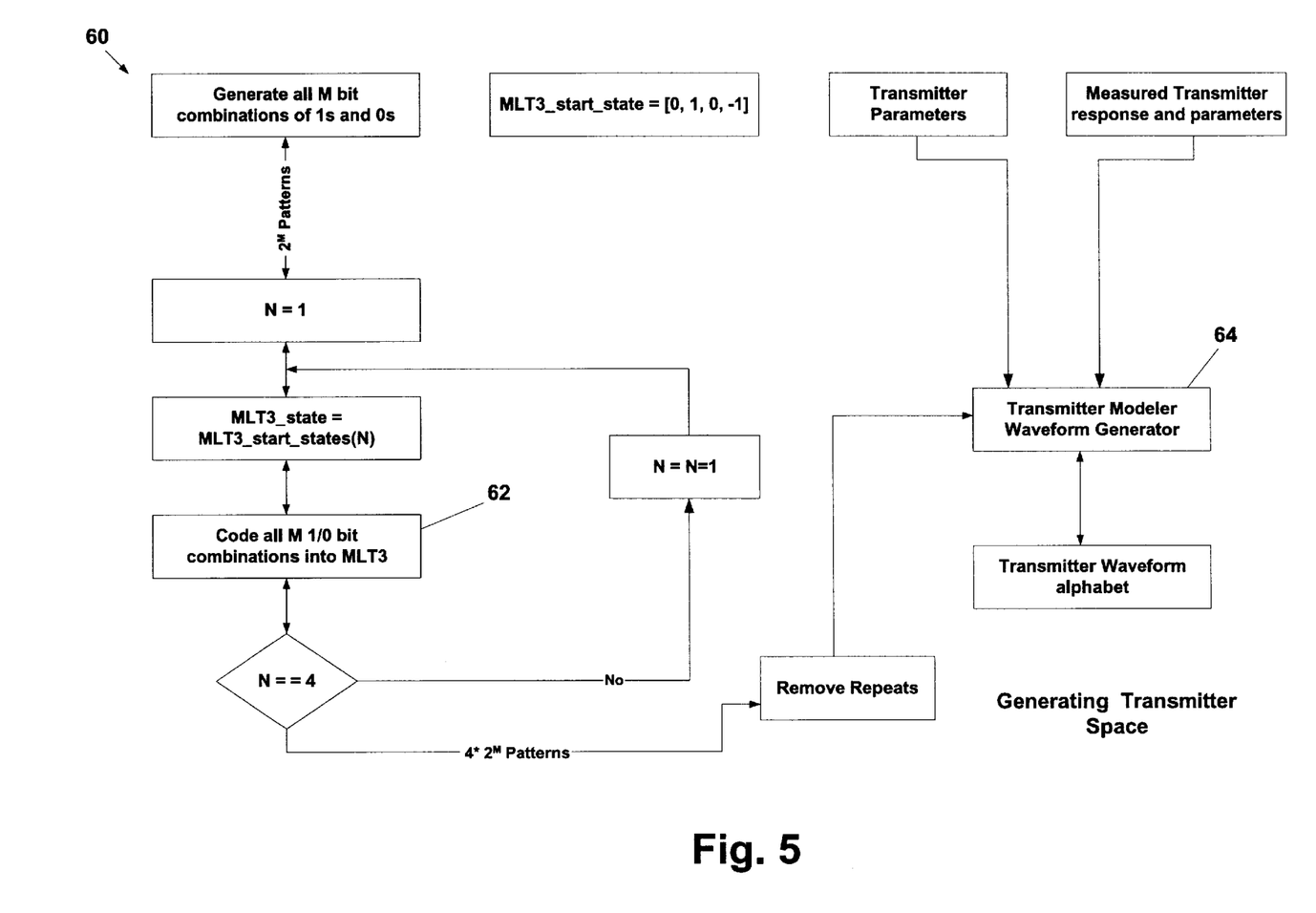
FIG. 5 is a flow chart showing generation of transmitter space.

First, transmitter space 60 is the collection of all unique possible M-bit transmitter waveforms. A bit error is identified if any of these waveforms sent by the transmitter is identified as a different waveform in the transmitter space by the receiver. FIG. 5 shows the flow chart for generating a transmitter space for MLT-3 (3 level Multi-Level Transmission) transmitter waveforms. As shown in FIG. 5, the binary Non-Return to Zero ("NRZ") code is converted into MLT-3 code at 62, as specified in the Twisted Pair Physical Media Dependent Technology ("TP-PMD") specifications. The MLT-3 trinary code is converted into a transmitter waveform at 64 with a desired pulse response, jitter, noise and asymmetries by the transmitter waveform modeler.

Additionally, the processing space accounts for NIC effects (see 66 in FIG. 4). The NIC attenuates the signal and is also a source of significant cross-talk noise. The main attenuation and cross-talk source in a NIC is the transformer used to couple the hardware to the cable. Attenuation information can be obtained from the device specifications provided by transformer manufacturer. If $H_{nic\_xtalk}$ and $H_{nic\_attn}$ are the NIC cross-talk and attenuation system responses, then the total response of the channel and the NIC is calculated as:

$$H_{total\_attn} = H_{channel\_attn} \oplus H_{nic\_attn}$$

$$H_{total\_xtalk} = H_{channel\_xtalk} \oplus H_{nic\_xtalk}$$

The model also calculates an equalizer value at 68. The equalizer is used to compensate for the effects of the channel. Equalizer can be calculated in many different ways. One equalizer calculation flow chart 70 is provided in FIG. 6. However, it should be noted that the equalizer gain should be limited and rolled off at high frequencies to avoid amplification of high frequency noise (72 in FIG. 6).

Figure 6:
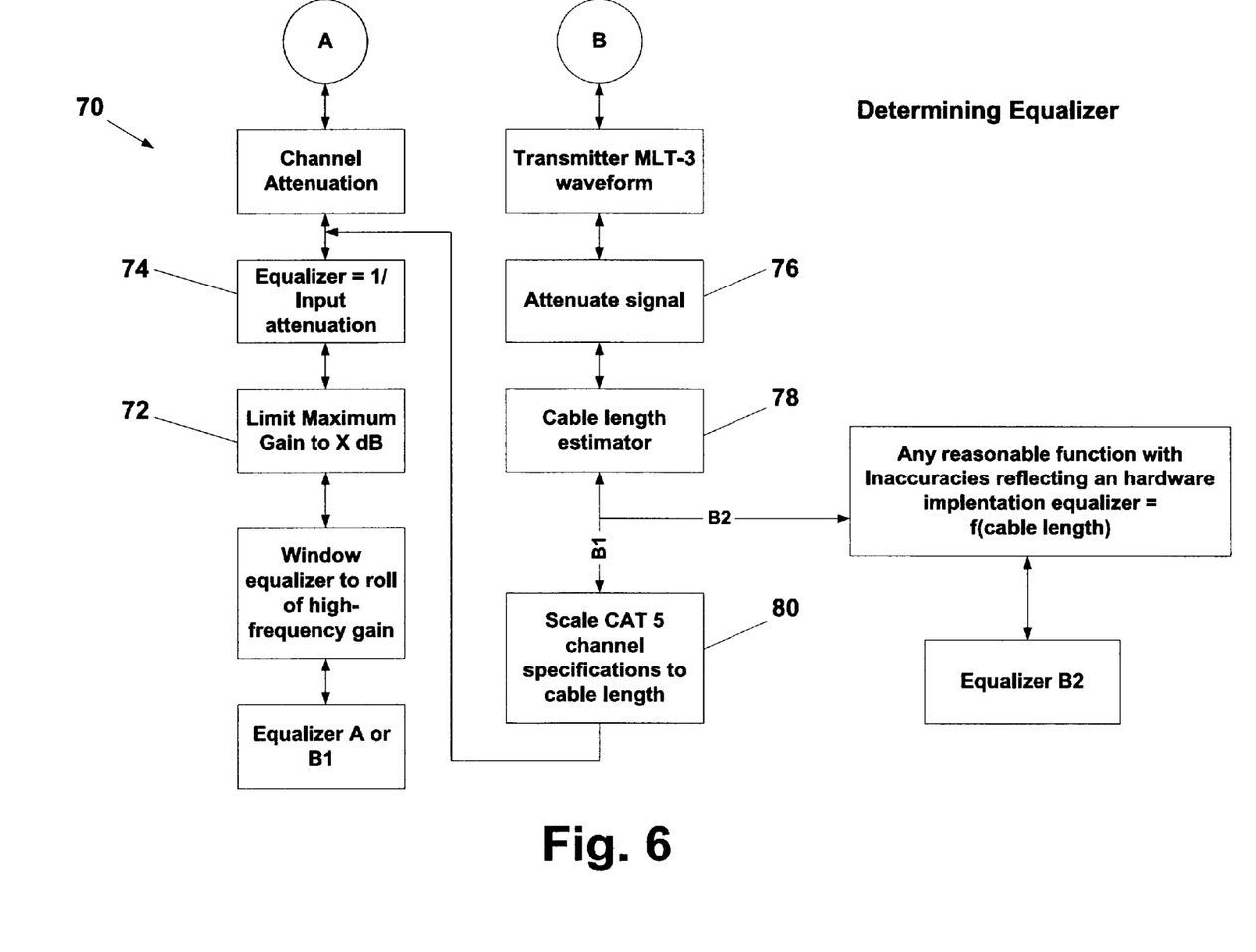
FIG. 6 is an equalizer determination flow chart.

A first type of equalizer may be called the Ideal equalizer, and is shown at path A in FIG. 6. In an ideal equalizer, the equalizer is the perfect inverse of the attenuation $H_{total\_attn}$ (i.e. $1/H_{total\_attn}$) (see 74 in FIG. 6). In a second type, shown as path B in FIG. 6, the length of the channel is calculated using the transmitter signal that has been attenuated by $H_{total\_attn}$, shown at reference 76. A cable length estimator 78 calculates the signal strength at a medium frequency (at which there is significant channel attenuation, but negligible effect due to changes in rise and fall time) and a low frequency (with very little channel attenuation). The length of the cable is directly proportional to the ratio of these two measurements. Changes in transmitter amplitude and rise/fall times will have very little effect on this measurement.

Additionally, CAT5/CAT5E channel attenuation specifications (for a 100 meter channel length) may be scaled 80 to represent the measured channel length. In such a situation, the inverse of this scaled attenuation will be the equalizer.

A third type of calculated equalizer may include a transfer function of an actual hardware implementation. For example, U.S. Pat. No. 5,699,022 by Tovar et. al. shows an actual hardware implementation of an adaptive cable equalizer. By assigning values to the R, L and C components described therein, the following transfer function was developed:

$$L = 4E-9 \mu H$$

$$R = 100 \Omega$$

$$\alpha = 0.1 \left( 10^{\frac{cableLength}{100}} \right)$$

$$I = 1.0 \, A$$

$$Z_1 = 4sRL \left( \frac{14s^2 + 37sRL + 14R^2}{8s^3L^3 + 42s^2L^2R + 42sLR^2 + 8R^3} \right) + R_2$$

$$Z_2 = R_2$$

$$H_{eq}(s) = (1-\alpha)Z_2 + \alpha Z_1$$

where $H_{eq}$ is the equalizer value, and s is a complex frequency. Using the above parameters, a BER calculation may be performed.

EXAMPLE 1

Figure 7:
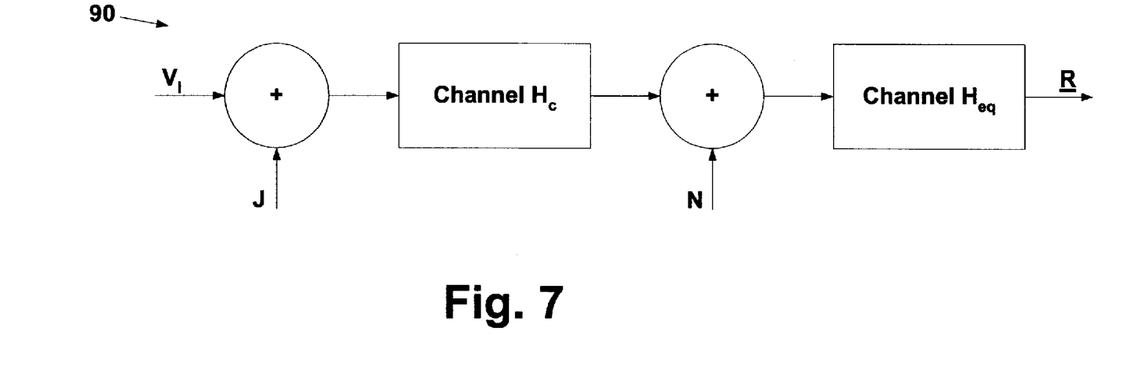
FIG. 7 is a sample channel model for calculating a bit error rate.

For example, the channel model 90 shown in FIG. 7 may be used in calculating the bit error rate of the channel. A bit error occurs when a transmitted waveform belonging to the alphabet was incorrectly mapped to a different waveform by the receiver. The following parameters are relevant:

| | |
|---|---|
| k | k is the time index. |
| i, j | alphabet index |
| $V_i(k)$ | $i^{th}$ waveform in the alphabet of the transmitter |
| J(k) | jitter modeled as additive noise |
| N(k) | other noise contibution - crosstalk, interference etc |
| $H_c(k)$ | Channel impulse response ($H_{total\_attn}$) |
| $H_{eq}(k)$ | Channel equalization impulse response in the receiver |
| $W_i(k)$ | $i^{th}$ waveform of the alphabet as seen by the receiver |
| R(k) | received waveform |

The BER calculation includes the following:

$$R = W_i + H_{eq} \oplus H_c \oplus J + H_{eq} \oplus N \qquad \text{Equation 1}$$

$$T = \ddot{J} + \ddot{N}$$

$$\ddot{J} = H_{eq} \oplus H_c \oplus J$$

$$\ddot{N} = H_{eq} \oplus N$$

$$P_{error} = \sum_{j \neq i} P(|R - V_i|^2 \geq |R - V_j|^2)$$

$$= \sum_{j \neq i} P(|W_i + T - V_i|^2 \geq |W_i + T - V_j|^2)$$

$$= \sum_{j \neq i} P(2(V_j - V_i)^t T \geq |W_i - V_j|^2 - |W_i - V_i|^2)$$

$2(V_j-V_i)^t T$ will be zero-mean Gaussian variable with variance $\sigma_{ij} 4E((V_{j-Vi})TT^t(V_j-V_i))$ if T is a zero-mean Gaussian variable.

Thus, $$P_{error}^i = \sum_{j \neq 1} erfc \left( \frac{|W_i - V_j|^2 - |W_i - V_i|^2}{\sigma_{ij}} \right)$$

$$P_{error} = \sum_i P_{error}^i P(V_i)$$

where $P(V_i)$ is the probability of occurrence of the alphabet waveform $V_i$

Rewriting $\sigma_{ij}$ using the relationship $E(\overline{NJ})=0$, then $$\sigma_{ij} = 4E((V_j - V_i)^t TT^t (V_j - V_i)^t) \qquad \text{Equation 2}$$

$$4E((V_j - V_i)^t (\overline{N} + \overline{J})(\overline{N} + \overline{J})^t (V_j - V_i)^t)$$

$$= 4E((V_j - V_i)^t \overline{NN}^t (V_j - V_i)^t) +$$

$$4E((V_j - V_i)^t \overline{JJ}^t (V_j - V_i)^t)$$

$$= A_{ij} + B_{ij}$$

In order to solve Equations 1 and 2, solutions must be determined for jitter, cross-talk and noise. Thus, the receiver model includes calculations of these parameters before solving for the BER.

Figure 8:
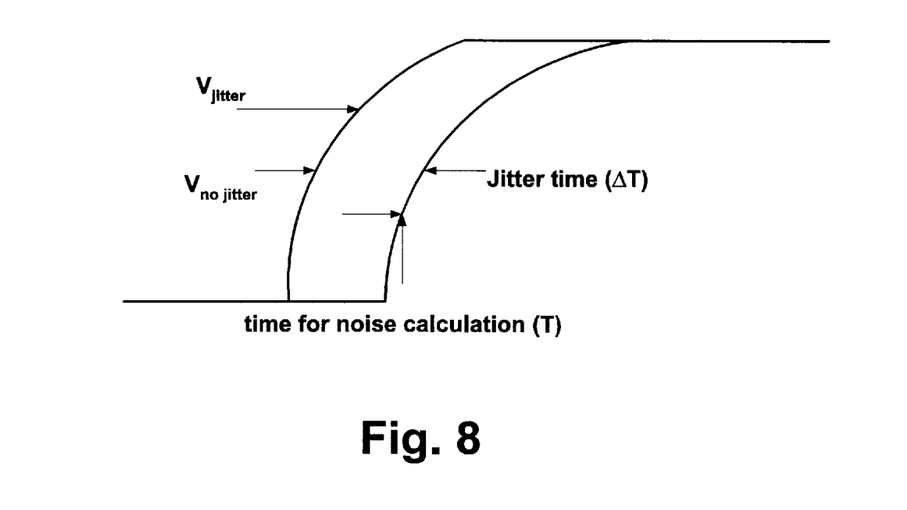
FIG. 8 is a sample waveform used to calculate jitter.

For purposes of the model, time jitter in the edges is modeled as equivalent amplitude jitter (see FIG. 8). The time jitter usually is a white Gaussian process with a variance $\sigma^2_{jitter}$. Time jitter causes the signal to be shifted from a reference point, and can be modeled by amplitude noise given by:

Amplitude noise=(slope of the waveform)*(jitter time $\Delta T$).

Applied to FIG. 8, the jitter calculation is as follows:

$$J = (V_{jitter} - V_{nojitter}) = \left[ \left( \frac{dV}{dt} \right)_{t=T} \Delta T \right]$$

The model assumes that $H_{eq} \oplus H_c \oplus J = J$, i.e. the equalizer perfectly compensates the attenuation of the channel. If $T_o$ is the sampling frequency, then $$J_i(k) = \left[ \left( \frac{dV_i}{dt} \right)_{t=kT_o} j_k \right] \cong \left( \frac{1}{3} \right) \left[ \begin{array}{c} \left( \frac{V_i((k-1)T_0) - V_i((k-2)T_0)}{T_0} \right) + \\ \left( \frac{V_i(kT_0) - V_i((k-1)T_0)}{T_0} \right) + \\ \left( \frac{V_i((k+1)T_0) - V_i(kT_0)}{T_0} \right) \end{array} \right] j_k$$

where

1. $j_k$ is the jitter process and is zero mean Gaussian with variance $\sigma^2_{jitter}$ and has time units.
2. $j_k$ is constant across each transition zone (edges).

3. $E(j_k j_l)=0$ if $k, l$ are in different transition zones

Applying Equation 2 above, then $$B_{ij} = 4E((V_j - V_i)^t \overline{JJ^t}(V_j - V_i)^t)$$

$$\cong 4\sigma_{jitter}^2 \sum_{transitionzone=0}^{numTransitionZone-1} \left[ \sum_{k \in transitionzone} (V_j(k) - V_i(k))d_i(k) \right]^2$$

Similarly, solutions for both cross-talk and noise provided to the model to calculate BER. The noise is modeled with two independent components, a white Gaussian noise process (Y) and a crosstalk noise process (X). X and Y are wide sense stationary process.

From Equation 2, $$A_{ij} = 4((V_j - V_i)(R_{YY} + R_{XX})(V_j - V_i))$$

The frequency domain representation of crosstalk noise (X) is $$X = H_{EQ} H_{XTALK} H_{MLT3},$$

where $H_{MLT3}$ is the frequency representation of the waveforms from the transmitter in the receiving NIC card.

Additionally, $$R_{XX} = F^{-1}(F(X)F^*(X)).$$

The correlation sequence is then used to build a toeplitz correlation matrix.

Finally, the white Gaussian noise process is modeled as $$R_{YY} = \sigma^2_{Noise} I,$$

where I is an identity matrix.

Once determined, jitter, cross-talk and noise parameters are inserted into Equation 2 by the model to calculate a BER. As noted previously, present state of the art requires a NIC transmitter, the channel, and a special NIC receiver to perform BER calculations. Also, empirical measurement of error rates is impractical using physical systems. Because of the low error rates, using a physical receiver may produce varying measurements of error rate when realistic measurement periods are used. However, the calculation method of the preferred embodiment yields results that are invariant with measurement duration, and that are achieved at a fraction of the time. For example, after characterizing a communication network by assessing parameters such as attenuation, noise and cross-talk, evaluation using the inventive model may be rapidly performed on the order of minutes rather than days.

Different physical NIC receivers also produce different measured error rates. In fact simply varying the temperature of the receiver slightly can have a dramatic impact on the measured error rates. The preferred embodiment software receiver is free of these defects, and instead allows for repeatable measurements, even though ambient conditions may change.

The present invention provides a system for easily determining throughput of a computer network without having to empirically gather error data. In particular, the present invention allows for a waveform to be captured from a transmitter having known operational parameters. The waveform may then be supplied to an Arbitrary Waveform Generator (AWG), which in turn may supply the waveform to a communications channel, thereby replacing the transmitter. A mathematical model of the transmitter is also constructed according to known operational parameters. Using the model, one or more of the operational parameters may be varied to produce a new or specialized waveform for the AWG, which may then be transmitted on the computer network to observe the response thereto. In this way, the physical parameters of a given transmitter are easily varied and tested, while at the same time, the system response to the varied waveform is also simply and easily evaluated.

Moreover, a mathematical model may be constructed to model an entire virtual communications network based only upon readily measurable operational parameters. Once such a model is constructed, one or more of the operational parameters may be altered to evaluate the performance of the network. Further, the model performance may be correlated to performance of the physical network to enhance the mathematical model and improve accuracy.

The present invention also allows simulation of any or all of the NIC transmitter, the channel and the receiver devices, so that the system may be evaluated at the convenience of the testing agency. In fact, testing can proceed at some remote location, while the physical system is already placed back in use. Thus, if any or all of the components become unavailable, virtual testing can proceed with simulation of the missing components. Specifically, if necessary, the actual output of any physical component may be captured and stored for use with a virtual modeled system to evaluate the system remotely.

Moreover, testing in the present state of the art is limited to only the actual transmitter and receiver used for testing. As a result, each and every transmitter and receiver produced may vary slightly, even if manufactured according to the same standards. Depending on the characteristics of the particular cards used for testing, an unrealistic measurement may ensue once the components are serially interconnected. Likewise, alteration or substitution of any component, even a commercially identical component, usually results in varying test results. The present invention discloses constructing a measurement model that permits varying the characteristics of the device under test to encompass NICs that are at the margins of specification, providing a more robust measurement of channel performance. Since a reference receiver or transmitter or channel is created, undesirable variations between results may be eliminated.

Finally, present state of the art is limited to only empirically finding the existing error rate. However, the present invention can also determine transmitter and channel parameters at which the tested channel will begin to have unacceptable performance levels and thereby establish available margin to failure for each of the parameters. The system and method may therefore be used to both benchmark and enable new product development.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for determining error rate in a computer network, comprising:

providing a transmitter and a communication channel system that includes at least one cable and a receiver;

operatively connecting said transmitter and said communication channel system;

providing a mathematical model for at least one predetermined design parameter;

capturing signals emitted from said computer network through said cable;

comparing said predetermined design parameter from said mathematical model to said captured signals to measure data throughput of said cable.

2. The method of claim 1, wherein said mathematical model is created by:

capturing signals from a physical transmitter;

calculating transmitter parameters from said captured signals;

replicating a pulse waveform from said physical transmitter; and providing said pulse waveform to an arbitrary wave form generator.

3. The method of claim 1, further including a signal generator, wherein said mathematical model includes pre-stored transmitter shapes that are used with said signal generator.

4. The method of claim 1, wherein said transmitter is a model transmitter with the at least one predetermined design parameter, such that said at least one predetermined design parameter may be compared at both ends of said cable to detect noise in said cable.

5. The method of claim 1 wherein said predetermined design parameter of said transmitter is at least one of the group comprising amplitude, jitter, rise time, fall time, amplitude asymmetry between negative and positive pulses, rise/fall time asymmetry, duty cycle distortion, general pulse shape, and noise.

6. The method of claim 5, wherein said predetermined design parameter may be varied in said mathematical model.

7. The method of claim 1, wherein said predetermined design parameter is of said communication channel, wherein said predetermined design parameter is at least one of the group comprising attenuation, cross-talk, return loss, length, impedance profile, propagation velocity and delay skew, transient noise, and channel output.

8. The method of claim 1, wherein said predetermined design parameter is of said receiver, wherein said predetermined design parameter is at least one of the group comprising line equalizer, matched filter, clock extraction, and channel decoding and source decoding.

* * * * *